United States Patent [19]

Goodacre et al.

[11] 4,311,205
[45] Jan. 19, 1982

[54] INDUSTRIAL TRUCKS AND BATTERY COVERS FOR THEM

[75] Inventors: Ronald Goodacre; Ronald W. Piper, both of Basingstoke, England

[73] Assignee: Lansing Bagnall Limited, Hampshire, England

[21] Appl. No.: 123,772

[22] Filed: Feb. 20, 1980

[30] Foreign Application Priority Data

Feb. 21, 1979 [GB] United Kingdom ............ 06210/79

[51] Int. Cl.³ ............................................. B62D 25/00
[52] U.S. Cl. ................................ 180/68.5; 296/65 R; 296/37.1; 296/37.15; 296/37.16; 297/191
[58] Field of Search ................... 180/68.5; 296/37.15, 296/65 R, 37.16, 37.1, 37.14, 63; 297/191 X

[56] References Cited

U.S. PATENT DOCUMENTS

| 1,325,630 | 12/1919 | Fair | 297/191 |
|---|---|---|---|
| 4,076,302 | 2/1978 | Sable | 296/65 R |
| 4,108,266 | 8/1978 | Wojtyna | 180/68.5 |

Primary Examiner—Robert R. Song
Attorney, Agent, or Firm—Cushman, Darby & Cushman

[57] ABSTRACT

An industrial battery powered truck which, as shown in FIG. 1, includes a chassis 1 on which is mounted a container 5 of a storage battery. The container has a hinged lid which is pivoted at the top of the ballast weight 11. The lid 9 carries a driver's seat 12 and, behind the driver's seat, a compartment 13 of electrical control gear for the truck. The container 13 has an openable cover 14. A pneumatic piston and cylinder 17 is connected between the ballast weight and the lid and provides force for raising or assisting the rise of the lid. The lid carries a console in the position of an arm rest by the side of the seat. The console carries at least one electrical control which is manually operable by the driver and incorporates trunking for an electrical cable between the manually operable control and the aforementioned control gear.

1 Claim, 3 Drawing Figures

INDUSTRIAL TRUCKS AND BATTERY COVERS FOR THEM

BACKGROUND OF THE INVENTION

This invention relates to industrial trucks, battery powered trucks and in particular to a truck incorporating a new arrangement of the battery, driver's seat and the electrical control gear.

SUMMARY OF THE INVENTION

In a preferred arrangement according to the invention, the storage battery or batteries are disposed in a container disposed on and above the chassis of the truck. Access to the container for servicing or renewal of the batteries is afforded by a lid which is hinged about an axis which is preferably above the ballast weight at the rear of the truck. The lid constitutes a support for the driver's seat, behind which is a compartment for the electrical control gear such as thyristors, contactors and the like, which are necessary for the conversion of the power from the battery to signals for controlling the movement of the truck. The compartment of the control gear has a cover which is openable for servicing or renewal of the components of the control gear. Preferably the control levers or other manually operable electrical actuators are likewise carried on the hinged lid and may be disposed either at the side of the seat or within reach on the compartment for the control gear. The seat, control gear and any ancillary controls mounted on the lid are movable together with the hinged lid with the aid of an axially resilient extensible strut comprising, for example, a piston and cylinder.

DESCRIPTION OF THE PREFERRED EMBODIMENT

Figure 1:
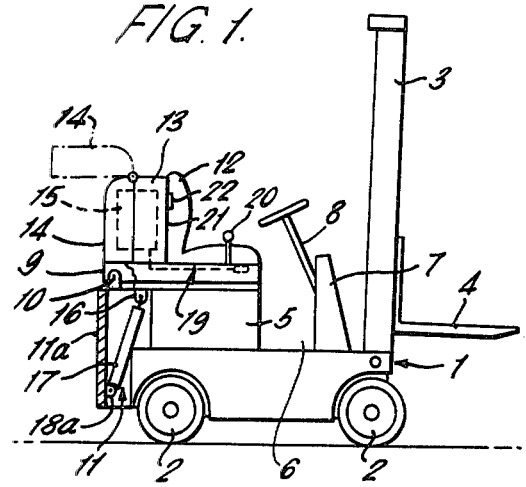
FIG. 1 is a schematic side view of a truck.

In this particular embodiment of the invention an industrial truck comprises a chassis 1 carried by ground wheels 2. At the front of the truck is a mast 3 for the carriage of lifting forks 4. Towards the rear of the truck is a body part 5 in the form of a container for the truck's storage batteries, which are usually heavy and bulky. Immediately in front of the container 5 is a space 6 for the accommodation of the legs of the driver of the truck. The front of this space is delimited by a pedestal 7, which is disposed immediately behind the mast 3 and carries a steering column 8, speed and brake control pedals and levers for controlling the movement of the forks.

Access to the container for the batteries is afforded by a hinged lid 9. The hinge 10 for the lid 9 is mounted on the top of the ballast weight 11 which is at the rear of the truck immediately behind the container 5. The lid 9 is robust enough to support a seat 12 and a driver sitting on the seat. This seat is mounted on and to one side of the lid 9. Behind the seat is a compartment 13 of approximately the same height as the backrest of the seat 12 and of a width conveniently approximately the same as the width of the lid 9. The compartment 13 has a lid 14 which is hinged at its top and opens rearwardly of the truck to provide access to the interior of the compartment 13, which contains the control gear 15 of the truck. By "control gear" is meant the principal components of the electrical drive circuits, such as thyristors, contactors, which owing to the comparatively high currents necessary for driving the truck, are usually quite bulky.

Figure 2:
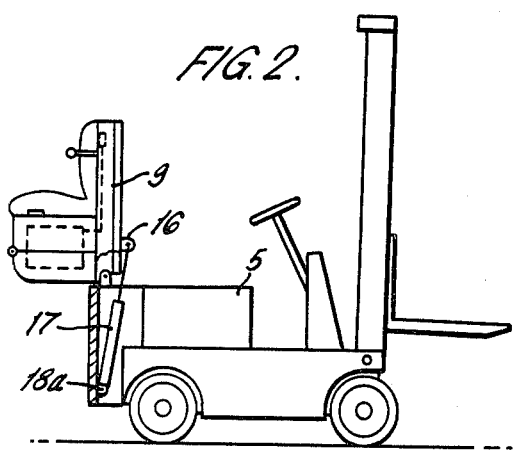
FIG. 2 resembles FIG. 1 but shows the truck with the hinged battery lid in a raised position.
Figure 3:
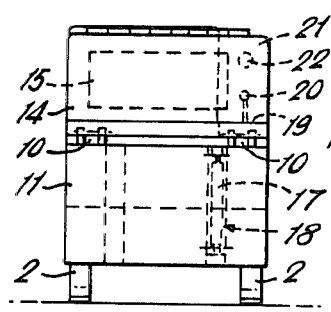
FIG. 3 is a schematic and simplified rear view of the truck.

The lid 9 may be raised from the position which is illustrated in FIG. 1 to an upright position, as illustrated in FIG. 2. For this purpose the lid has a bracket 16 providing a pivotal mount for the piston of a pneumatic cylinder 17 of which is disposed in a vertical slot 18 in the ballast weight. The lower end of the cylinder is pivotally mounted to the ballast weight at 18a; the cylinder is normally hidden from view by the rear cover 11a of the ballast weight. The piston and cylinder constitute an axially resilient strut which, as the lid 9 is lowered to a horizontal position, is compressed axially. When the lid is raised, the piston and cylinder, which act in the manner of a spring which has a constant rate, assist the raising of the lid 9. Moreover, when the lid is fully raised, as is shown in FIG. 2, the piston and cylinder maintain the lid in its raised position except against a substantial downwardly acting force. When the lid is raised to the position shown in FIG. 2, the container 5 may be removed from the truck's chassis.

The piston and cylinder could be constituted by a power operated hydraulic or pneumatic jack. It could be disposed almost horizontally, provided that its lower end is pivoted below the pivot axis of the lid 9.

The seat 12 is mounted to one side of the lid 9 in order to provide room for a console 19 which is in the position of an arm rest for the driver. The console carries a reversing lever 20, preferably also other manually operable electrical actuators which the driver requires for controlling the operation of the truck, and also trucking for electrical cables between these actuators and the control gear. The front face 21, so far as it is not covered by the seat 12, is convenient for other controls, such as a key switch 22.

The described arrangement renders the control gear easily accessible and provides better forward visibility for the driver than hitherto.

We claim:

1. In an industrial battery-powered truck which includes a chassis on which is mounted a container for an electric storage battery which provides power for operating the truck, the improvement which comprises the combination of:
   (i) a hinged lid for said container, said lid having open and closed positions;
   (ii) a driver's seat disposed on said lid;
   (iii) an openable compartment disposed on said lid behind the said seat;
   (iv) electrical control gear for said truck, said electrical control gear being disposed within said openable compartment; and
   (v) an axially extensible strut, which is connected between the lid and the chassis and which comprises means for urging said lid towards the open position thereof.

* * * * *